United States Patent Office 3,763,250
Patented Oct. 2, 1973

3,763,250
HALOGENATION PROCESS
Charanjit Rai, Somerset, and Alphonso W. Marcellis, Lake Interval, N.J., assignors to Cities Service Oil Company, Tulsa, Okla.
No Drawing. Filed June 25, 1971, Ser. No. 157,043
Int. Cl. C07c 17/10
U.S. Cl. 260—648 R     5 Claims

ABSTRACT OF THE DISCLOSURE

A novel process for halogenating organic compounds under mild conditions using a halogenating system comprising halogen in a solution of phosphorus pentoxide in trimethyl phosphate. The process is particularly useful in the halogenation of difficulty halogenated acyl halides and cycloparaffins.

BACKGROUND OF THE INVENTION

The halogenation of numerous classes of organic compounds involving replacement of hydrogen on a saturated carbon by halogen often requires vigorous reaction conditions such as high temperature and pressure as well as long reaction times and the use of free radical initiators or high intensity light. Such reaction conditions are often difficult to control and cause undesirable side reactions. For example, the reaction of halogens with paraffinic hydrocarbons requires actinic radiation or a radical initiator in order for halogenation to occur. This this type of reaction is often difficult to control is illustrated by the fact that mixtures of chlorine and gaseous hydrocarbons such as methane may exployed when irradiated by ultraviolet light.

The alpha-halogenation of carboxylic acids may be accomplished by the Hell-Volhard-Zelinsky reaction which is believed to proceed by the halogenation of the corresponding acyl halide which is generated in situ. However, the direct halogenation of an acyl halide, in most cases, proceeds with difficulty. Extended reaction times, free radical initiators, and high intensity light are often required to realize the halogenation of an acyl halide.

The use of free halogen as the halogenating agent to replace hydrogen on a saturated carbon of an organic compound has the disadvantage of generating hydrogen halide as a reaction by-product. The generation of hydrogen halide precludes the use of ferrous reaction equipment wherever such equipment may come in contact with the hydrogen halide.

SUMMARY OF THE INVENTION

It is an object of this invention to provide an improved halogenation process.

It is another object of this invention to provide a halogenation process that causes rapid halogenation of organic compounds under mild reaction conditions.

It is yet another object of this invention to provide a halogenation process that will cause replacement by halogen of hydrogen on a saturated carbon of an organic compound without evolution of by-product hydrogen halide.

Another object of this invention is to provide a rapid process for the halogenation of organic compounds such as cycloparaffins and acyl halides in which hydrogen halide is not evolved as a by-product.

Other objects and advantages of this invention will be apparent to those skilled in the art from this disclosure.

The foregoing objects are achieved in accordance with this invention. In general, this invention consists of a process for halogenating organic compounds selected from the group consisting of cycloparaffins and acyl halides having an alpha-hydrogen comprising contacting said organic compound with halogen in a solution of phosphorus pentoxide in trimethyl phosphate.

Thus by practicing the instant invention it is possible to cause rapid halogenation of organic compounds under mild reaction conditions. Use of the halogenation process of this invention makes unnecessary the employment of radical initiators and actinic radiation. In addition, the halogenation reaction is easily controlled. In the process of this invention where hydrogen on a saturated carbon of an organic compound is replaced by halogen, there is no evolution of by-product hydrogen halide.

DESCRIPTION OF THE PREFERRED EMBODIMENTS

This invention is concerned with a novel and improved process for the halogenation of organic compounds. Use of the process of this invention for the halogenation of organic compounds has a number of advantages over prior or art halogenation processes. Halogenations carried out by use of the instant halogenation process proceed smoothly and rapidly under mild reaction conditions. In addition, radical initiators and actinic radiation are not required. Furthermore, otherwise difficultly halogenated organic compounds are readily halogenated. A further advantage of halogenations using the process of this invention is that when hydrogen on a saturated carbon of an organic compound is replaced by halogen, there is no evolution of by-product hydrogen halide.

The halogenation process of this invention comprises contacting the organic compound to be halogenated with halogen in a solution of phosphorus pentoxide in trimethyl phosphate. It is preferred that the mole ratio of halogen to phosphorus pentoxide be from about 3:1 to about 1:3 and most preferably about 1:1. The choice of halogen is not critical and is largely a matter of choice. While the halogen may be fluorine, chlorine, bromine, or iodine, the preferred halogens are chlorine and bromine. The reaction temperatures of our process are generally within the range of about 25° to about 150° C. and preferably within the range of about 40° to 125° C. Atmospheric pressure is generally employed, although it will be understood that greater than atmospheric pressure may be used when elevated temperatures are employed. Reaction pressures are broadly within the range of about 1 to 5 atmospheres with pressures of about 1 to 2 atmospheres being preferred.

The process of this invention is useful for halogenating classes of organic compounds that are difficult to halogenate by other methods. The process of this invention has its greatest utility in the halogenation of acyl halides having an alpha-hydrogen and in the halogenation of cycloparaffinic hydrocarbons. Both of the foregoing halogenation reactions involve replacement by halogen of hydrogen on a saturated carbon. The process has the added advantage that the trimethyl phosphate reacts with by-product hydrogen halide to form methyl halide. The methyl halide, unlike the hydrogen halide, is non-corrosive and is a valuable by-product of the reaction, thereby improving the overall economics of the process. Additional advantages of the instant process are that it is carried out under mild reaction conditions, it proceeds relatively rapidly, and neither free radical initiators not actinic radiation are required.

Without being restricted thereto, it is believed that the reaction of this invention to replace hydrogen on a saturated carbon with halogen is as follows. For illustrative purposes, the substrate shown being halogenated is a cycloparaffinic hydrocarbon where R is a cycloparaffinic hydrocarbyl group.

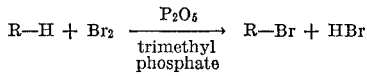

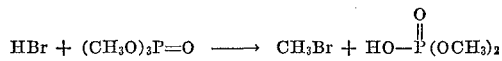

It will be understood that R may be either a substituted or unsubstituted cycloparaffinic hydrocarbyl group. Acyl halides having an alpha-hydrogen may similarly be halogenated in the alpha-position. Removal of the hydrogen halide by the trimethyl phosphate tends to promote the halogenation reaction.

Our invention will be further illustrated by the following specific examples.

EXAMPLE I

A 500-ml. round bottom flask equipped with magnetic stirrer, water cooled condenser topped with a CaSO₄ drying tube, thermometer, addition funnel, and nitrogen-inlet tube is flamed to remove moisture. While purging the system with nitrogen, 100 ml. of a middle cut of freshly distilled trimethyl phosphate is adde to the flask. Using precautions to maintain anhydrous conditions, 24.0 g. (0.17 mole) of phosphorus pentoxide is added, yielding an opaque white solution. To this stirred solution are added 27.0 g. (0.17 mole) of bromine, dropwise over a 10 minute period. There is no exotherm during the bromine addition. The reaction mixture has the color of bromine. To the reaction mixture are added 14.2 g. (0.17 mole) of cyclohexane and the mixture is stirred at 110° C. After about 1.5 hours, the bromine color has faded to clear yellow, indicating that the bromination is essentially complete. The reaction mixture is heated at 110° C. for an additional 19.5 hours and then poured into 250 ml. of ice water and extracted with three 100 ml. portions of ether. The combined ether extracts are washed with 150 ml. of water and dried over anhydrous CaSO₄. The ether is removed at room temperature by passing nitrogen through the solution. The yield of product is 7.4 g. (26% of theoretical). Infrared analysis shows the product to be bromocyclohexane.

In comparison, it is reported in J. Org. Chem., 18, 649 (1953) that a similar yield of bromocyclohexane is obtained in a bromination using N-bromosuccinimide and benzoyl peroxide catalyst wherein the reaction mixture in carbon tetrachloride is heated under reflux for 12 hours.

EXAMPLE II

Example I is essentially repeated using 250 ml. of undistilled trimethyl phosphate, 74.9 g. (0.53 mole) of phosphorus pentoxide, 85.0 g. (0.53 mole) of bromine, and 33.6 g. (0.48 mole) of cyclopentane. The reaction mixture is stirred at 50° C. for 5 hours and at room temperature for an additional 17 hours. The reaction mixture is light orange in color at this point. The reaction mixture is then poured into 500 ml. of ice water. Separation of the organic phase yields 38.7 g. of dark colored, liquid product.

The crude product is vacuum distilled through a spinning band column to yield 8.6 g. (12% of theoretical) of bromocyclopentane and 15.5 g. (31% of theoretical) of trans-1,2-dibromocyclopentane. The structures of the products are confirmed by infrared spectroscopy.

EXAMPLE III

Example I is essentially repeated using trimethyl phosphate as the solvent, 26.9 g. (0.19 mole) of phosphorus pentoxide, 30.2 g. (0.19 mole) of bromine, and 18.5 g. (0.19 mole) of cycloheptane. The reaction mixture is stirred at 118° C. for one hour and at room temperature for an additional 24 hours. The reaction product is 9.9 g. (29.9% of theoretical) of bromocycloheptane.

In contrast, it is disclosed in J. Org. Chem., 18, 649 (1953) that cycloheptane is brominated to give a 30% yield of bromocycloheptane busing N-bromosuccinimide as the brominating agent in a reaction employing benzoyl peroxide as a free radical initiator.

EXAMPLE IV

Using the general procedure of Example I, a halogenation system is prepared by adding 60.0 g. (0.42 mole) of phosphorus pentoxide and 67.8 g. (0.423 mole) of bromine to 250 ml. of dry trimethyl phosphate. To the stirred halogenation system heated to 40° C. are added 47.8 g. (0.20 mole) of sebacoyl chloride portion-wise over a 5-minute period. The reaction mixture is heated at 76° C. for 15 minutes after which time the mixture becomes completely colorless. The mixture is then cooled to room temperature and 100 ml. of methanol are slowly added thereto to convert the acid chloride to the dimethyl ester. An exotherm occurs during the addition of the methanol. The reaction mixture is poured into ice water and the organic layer extracted with three 100 ml. portions of naphtha. The extract is dried over anydrous CaSO₄. The naphtha is then stirred off to yield 48.7 g. of liquid product containing 28.3% of bromine. Infrared spectroscopy and elemental analysis indicate the product is a mixture of the monobromide and the dibromide of the dimethyl ester of sebacic acid.

EXAMPLE V

Example IV is essentially repeated using 200 ml. of dry trimethyl phosphate, 55.0 g. (0.387 mole) of phosphorus pentoxide, 62.0 g. (0.387 mole) of bromine, and 44.7 g. (0.198 mole) of azeleoyl chloride. The stirred, bromine-colored reaction mixture is heated at 80° C. and within 10 minutes becomes colorless. The stirred mixture is heated at 80° to 84° C. for an additional hour. A gas evolved during the reaction is identified by infrared as methyl halide, indicating reaction of by-product hydrogen bromide with trimethyl phosphate to produce methyl bromide. The reaction mixture is cooled to room temperature and 100 ml. of methanol are added thereto over a 30-minute period. An exotherm occurs. The mixture is cooled to room temperature and poured into 520 ml. of ice water. The organic layer is taken up in pentane and dried over anhydrous CaSO₄. Evaporation of pentane leaves 50 g. of product. The crude product is distilled through a spinning band column under reduced pressure. Infrared spectroscopy and elemental analysis indicate that the product is a mixture of the monobromide and the dibromide of the dimethyl ester of azeleic acid.

In contrast to Examples IV and V, when adipoyl chloride is brominated with elemental bromine at steam bath temperature, the bromination reaction requires about 14 hours. This is disclosed in Org. Synthesis, Coll. vol. III, 623 (1965).

It will be understood that the halogenation process of this invention may employ any halogen. Although bromine has been exemplified herein, fluorine, chlorine, and iodine may also be used. The halogenation process of this invention may be used generally to halogenate cycloparaffins and acyl halides having an alpha-hydrogen. The cycloparaffins and acyl halides having an alpha-hydrogen. The cycloparaffins and the acyl halides having an alpha-hydrogen may or may not contain substituent groups. The acyl halide may be completely aliphatic or may contain aromatic or naphthenic portions provided it contains an alpha-hydrogen. In addition, the acyl halide may contain one, two, three, or more acid halide groups provided there is present in the molecule at least one alpha-hydrogen. The advantages of halogenations carried out according to this invention include mild reaction conditions, relative rapidity, absence of by-product hydrogen halide, and no requirement for free radical initiators or actinic radiation.

While our invention has been illustrated by various specific examples, it will be understood that the scope of our invention is not restricted thereto.

We claim:

1. A process for halogenating cycloparaffins comprising contacting said cycloparaffin with halogen in a solution of phosphorus pentoxide in trimethyl phosphate wherein the mole ratio of halogen to phosphorus pentoxide is from about 3:1 to about 1:3 and the halogenation is carried out at a temperature of from about 25° C. to about 150° C.

2. The process of claim 1 wherein the halogen is selected from the group consisting of chlorine and bromine.

3. The process of claim 2 wherein the mole ratio of halogen to phosphorus pentoxide is about 1:1.

4. The process of claim 3 wherein the halogenation is carried out at a temperature of from about 40° C. to about 125° C.

5. The process of claim 4 wherein the cycloparaffin is selected from the group consisting of cyclopentane, cyclohexane, and cycloheptane.

References Cited

UNITED STATES PATENTS 2,287,665  6/1942  Britton et al. ____ 260—648 R X
2,509,160  5/1950  McBee et al. _____ 260—648 C

OTHER REFERENCES

Houben-Weyl, Methoden der Organischen Chemie XII/2, part 2, 1964, pp. 252–253.

HOWARD T. MARS, Primary Examiner

U.S. Cl. X.R.

260—544 R, 544 Y, 648 G, 648 F

UNITED STATES PATENT OFFICE
Certificate

Patent No. 3,763,250            Patented October 2, 1973

Charanjit Rai and Alphonso W. Marcellis

Application having been made by Charanjit Rai and Alphonso W. Marcellis, the inventors named in the patent above identified, and Cities Service Oil Company, Tulsa, Oklahoma, a corporation of Delaware, the assignee, for the issuance of a certificate under the provisions of Title 35, Section 256, of the United States Code, adding the name of Donald E. Pearson as a joint inventor, and a showing and proof of facts satisfying the requirements of the said section having been submitted, it is this 19th day of November 1974, certified that the name of the said Donald E. Pearson is hereby added to the said patent as a joint inventor with the said Charanjit Rai and Alphonso W. Marcellis.

FRED W. SHERLING
*Associate Solicitor.*

Disclaimer 3,763,250.—*Charanjit Rai*, Somerset, and *Alphonso W. Marcellis*, Lake Interval, N.J., and *Donald E. Pearson*, Nashville, Tenn. HALOGENATION PROCESS. Patent dated Oct. 2, 1973. Disclaimer filed Aug. 8, 1974, by the assignee, *Cities Service Oil Company*.

Hereby enters this disclaimer to all claims of said patent.

[*Official Gazette December 24, 1974.*]